United States Patent [19]

Pann

[11] Patent Number: 4,503,527
[45] Date of Patent: Mar. 5, 1985

[54] METHOD FOR ENHANCEMENT OF THE SIGNAL-TO-NOISE RATIO IN SEISMIC REFLECTION SIGNALS

[75] Inventor: Keh Pann, Richardson, Tex.

[73] Assignee: Mobil Oil Corporation, New York, N.Y.

[21] Appl. No.: 578,401

[22] Filed: Feb. 9, 1984

Related U.S. Application Data

[63] Continuation of Ser. No. 248,173, Mar. 30, 1981, abandoned.

[51] Int. Cl.³ ............................................. G01V 1/36
[52] U.S. Cl. ....................................... 367/53; 367/63; 364/421
[58] Field of Search ..................... 367/38, 50, 52, 53, 367/59, 63; 364/421

[56] References Cited

U.S. PATENT DOCUMENTS

| | | | |
|---|---|---|---|
| Re. 30,347 | 7/1980 | Musgrave | 367/51 |
| 3,651,451 | 3/1972 | Ruehle | 367/52 |
| 3,794,827 | 2/1974 | Wideic | 367/52 |
| 4,134,098 | 1/1979 | Ruehle | 181/111 |
| 4,208,732 | 6/1980 | Ruehle | 367/42 |
| 4,208,732 | 6/1980 | Ruehle | 367/52 |
| 4,209,854 | 6/1980 | Ruehle | 367/50 |
| 4,241,429 | 12/1980 | Bloomquist et al. | 367/52 |
| 4,363,113 | 12/1982 | Taner et al. | 367/63 |

Primary Examiner—Nelson Moskowitz
Attorney, Agent, or Firm—A. J. McKillop; Michael G. Gilman; George W. Hager, Jr.

[57] ABSTRACT

In seismic exploration, seismic reflection signals are obtained along a line of exploration. These seismic reflection signals are time shifted to correct for moveout caused by horizontal dipping and diffraction subsurface events. These connected signals are stacked with a dip independent velocity parameter to provide a zero source-to-receiver seismic record section enhanced in signal-to-noise ratio.

3 Claims, 9 Drawing Figures

DEPTH FOR SEISMIC RAYS
TIME FOR TRAVEL TIME ELIPSE ABC

COMMON MIDPOINT
GATHER OF TRACES

METHOD FOR ENHANCEMENT OF THE SIGNAL-TO-NOISE RATIO IN SEISMIC REFLECTION SIGNALS

This is a continuation of copending application Ser. No. 248,173, filed Mar. 30, 1981, now abandoned.

BACKGROUND OF THE INVENTION

This invention relates to a method for enhancing the signal-to-noise ratio in a suite of seismic traces and more particularly to the enhancement of the primary-to-multiple reflection ratio in the seismic traces.

In seismic exploration, seismic energy is generated at a shotpoint at or near the surface of the earth, is reflected from subsurface interfaces between layers of the earth, and is received by a spread of geophones on the surface of the earth. The geophone signals are recorded in the form of a suite of seismic traces. One common method of seismic exploration is known as common depth point exploration. In this method a number of seismic traces are recorded representing seismic energy reflections from a common reflecting point. Referring to FIG. 1, seismic energy, produced at each of a plurality of spaced shotpoints $SP_1$-$SP_n$, is reflected from a subsurface interface at a common depth point (CDP) and is received at a plurality of spaced locations $X_1$-$X_n$ for the production of a suite of seismograms. Such a suite of four seismic traces $S_1$-$S_4$ is illustrated in FIG. 2. The ordinate in FIG. 2 represents the horizontal spacing $X_1$-$X_4$ of the receivers which produce the seismograms $S_1$-$S_4$. The primary reflection signals $P_1$-$P_4$ and the multiple reflection signals $M_1$-$M_4$ received from the common depth point reflecting surface are indicated as falling along the curves H and K respectively. Curves H and K represent the arrival time from trace to trace of each of the reflection signals in the suite of seismograms.

One technique for improving the signal-to-noise ratio in such a suite of seismograms makes use of the normal moveout correction for enhancement of primary-to-multiple reflection ratios. Reference is made to U.S. Pat. No. 4,209,854 to W. H. Ruehle for a detailed description of such technique. Briefly, however, acoustic velocity is determined from seismograms by use of the relationship:

$$T^2 = T_o^2 + 4h^2/V_{sk}^2 \quad (1)$$

where,

T is the time of the reflection on a particular seismic trace, $T_o$ is the time of that same reflection on an idealized seismic trace with zero source-to-receiver offset, h is one-half the horizontal distance between the shotpoint and the receiver producing the particular seismic trace, and $V_{sk}$ is the acoustic stacking velocity characteristic of the earth medium and the dip of the structure.

The time shift from trace to trace of the relfections from the common depth point surface is commonly known as normal moveout and is specified by the function:

$$\Delta T = T_o - \sqrt{T_o^2 + 4h^2/V_{sk}^2}$$

The traces are time shifted one with respect to another based on different assumed values of average medium velocity. For each reflection, a correlation operation indicates the semblance or signal power between the traces for the different values of assumed average velocity. A maximum in the signal power indicates average velocity to that reflection as illustrated in FIG. 3. This is carried out for each reflection on the suite of seismograms so that average medium velocity to each of these reflectors is determined. The seismic traces are then stacked for the determined average medium velocities to produce a seismic record having enhanced signal-to-noise ratio.

SUMMARY OF THE INVENTION

In accordance with the present invention there is provided a method for enhancing primary reflection signals obtained along a line of exploration in which dipping and diffraction events can be stacked with a dip independent velocity parameter, thereby providing an enhanced seismic record section in signal-to-noise ratio. This method incorporates a new and improved moveout correction technique for using arbitrary source-to-receiver seismic reflection signals to produce a zero source-to-receiver seismic record section.

In a more specific aspect, the seismic reflection signals are gathered into sets of common offset seismic signals having variable midpoints. Each seismic signal is moveout corrected with the new and improved moveout correction technique. The signals are then stacked in common offset gathers over the midpoint variables. These stacked gathers are summed over the offset variables for each midpoint to produce a seismic record section in which the dipping and diffraction events are stacked with a dip independent velocity parameter.

In a still further aspect, the common offset moveout corrected seismic reflection signals are stacked over the midpoint variables. The moveout correction and stacking steps are repeated for a plurality of reflected time windows and selected seismic velocities. The seismic velocity yielding the largest similarity or correlation among the time windows of the stacked signals is the dip independent medium velocity.

DESCRIPTION OF THE PREFERRED EMBODIMENT

It has been the conventional practice to stack normal moveout corrected seismic traces to produce an enhanced seismogram with improved signal-to-noise ratio. However, the presence of a dipping reflector or a diffraction event introduce distortion into such an enhanced seismogram. In a homogeneous medium of constant velocity, the travel time of seismic energy associated with a plane dipping reflector satisfies the normal moveout expression of equation (1) when:

$$V_{sk} = V_{ACTUAL}/\cos\phi$$

where $\phi$ = dip of reflecting plane.

Depending upon the amount of dip, the stacking velocity $V_{sk}$ may not approximate the actual value. Particularly where crossing events are present with differing dips, different stacking velocities are required to align these events. For a diffraction event, the stacking velocity depends on the relative positions of the diffractor and the source-receiver midpoint location. Consequently, neither dipping events nor diffraction events are stacked well following normal moveout correction.

Another velocity estimation method, sometimes called migration velocity analysis is based upon a correlation function which measures the similarity among the individually migrated common offset seismic traces over a grid of travel times and velocity values. However it has been found that there does not always exist an unambiguous semblance peak in the correlation function. When the migration velocity varies the semblance peak associated with a certain event will not only vary its magnitude, but the semblance peak location will also migrate according to its travel time and dip angle. Thus, the semblance peak computed for a given surface location in the migration velocity analysis technique may not represent the true migration velocity. An even stronger semblance peak associated with the same event may peak at a differing velocity observable at a neighboring location on the seismogram.

It is therefore, a specific feature of the present invention to provide a new and improved moveout correction technique by which dipping and diffraction events can be stacked with a dip independent velocity parameter, thereby providing an even greater enhanced seismic section in signal-to-noise ratio. This new and improved correction technique will be hereafter termed A-Z moveout correction since it uses arbitrary source-to-receiver seismic reflection signals to produce a zero source-to-receiver seismic record section.

Figure 4:
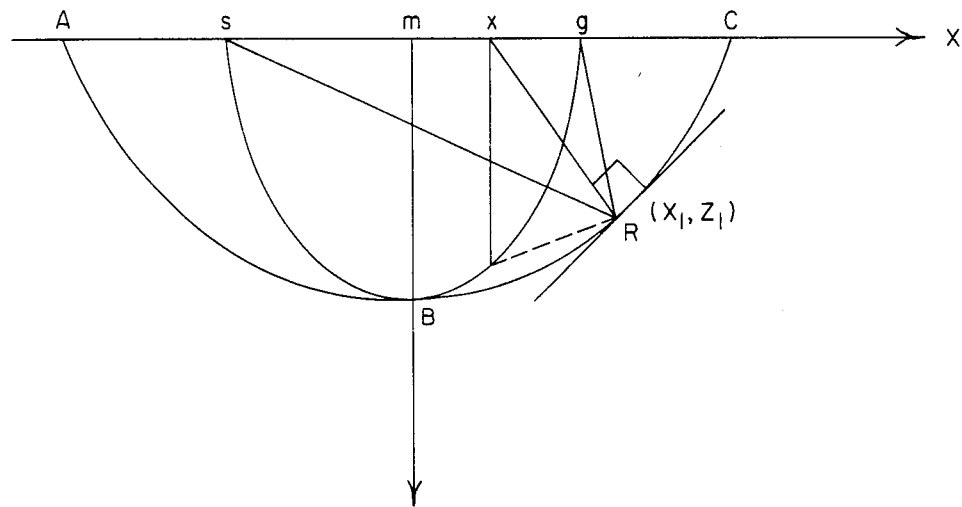
FIG. 4 illustrates the seismic exploration technique of the present invention when producing a suite of seismic traces from a dipping medium reflector R.

Referring now to FIG. 4, the shotpoint location s, receiver location g, and midpoint m are shown. If a seismic event is observed at a time T, the potential medium reflector that may contribute to this event has the geometry described by the ellipse ABC.

The A-Z moveout correction for such elliptical geometry is based upon the expression:

$$T^2 = (h^2 T_o^2)/[h^2 - (m-x)^2] + 4h^2/V_{AZ}^2, \quad (3)$$

where $0 < |m-x| < h$, or $T^2 = T_o^2 + 4h^2/V_{AZ}^2$ where $m = x$,

T is the time of the reflection on a particular input seismic trace, $T_o$ is the time of that same reflection on an idealized output seismic trace with zero source-to-receiver offset, h is one-half the horizontal offset distance between the source and the receiver producing the particular seismic trace, m is the midpoint surface location between the source and the receiver, x is the surface location where the seismic traces will be stacked or velocity estimated, and $V_{AZ}$ is the A-Z velocity The time shift from trace-to-trace of the reflections for A-Z moveout correction is specified by the expression:

$$\Delta T = T_o - \sqrt{(h^2 T_o^2)/[h^2 - (m-x)^2] + 4h^2/V_{AZ}^2} \quad (4)$$

For velocity estimation, $V_{AZ}$ is to be estimated from the seismic data. This estimated velocity can then be used in accordance with the present invention to generate a stacked section.

To illustrate the implementation of the invention, it is convenient to further express equation (3) as follows:

$$T^2 = T_1^2 + 4h^2/V_{AZ}^2 \quad (5)$$

$$T_1^2 = h^2 T_o^2/[h^2 - (m-x)^2], \text{ for } 0 < |m-x| < h \quad (6)$$

$T_1 = T_o$, for $m = x$ where $T_1$ is an intermediate variable.

Figure 5:
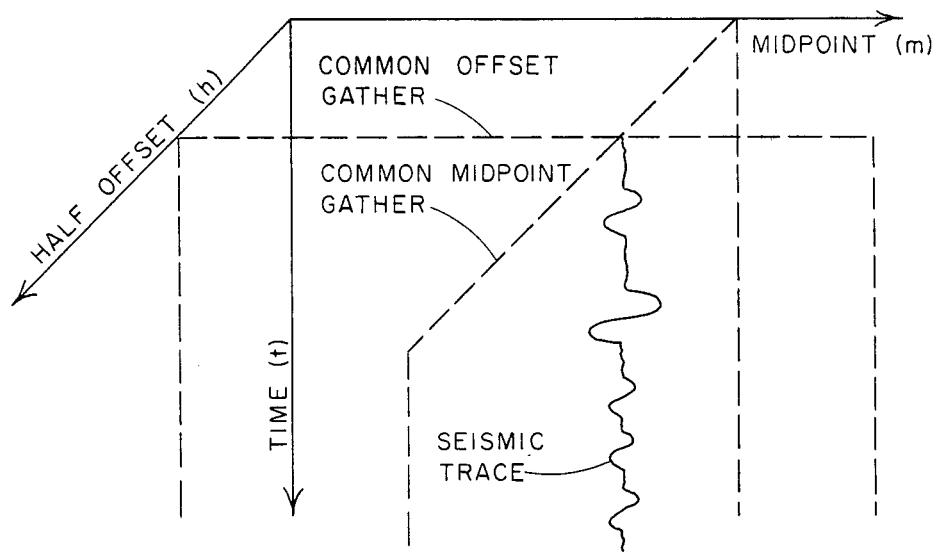

Further, the collection of seismic traces to be used in the implementation is illustrated in FIG. 5. The common offset gather of traces and the common midpoint gather of traces are illustrated by the dashed lines as plane slices orthogonal to the half offset axis h and the midpoint axis m respectively.

Figure 6:
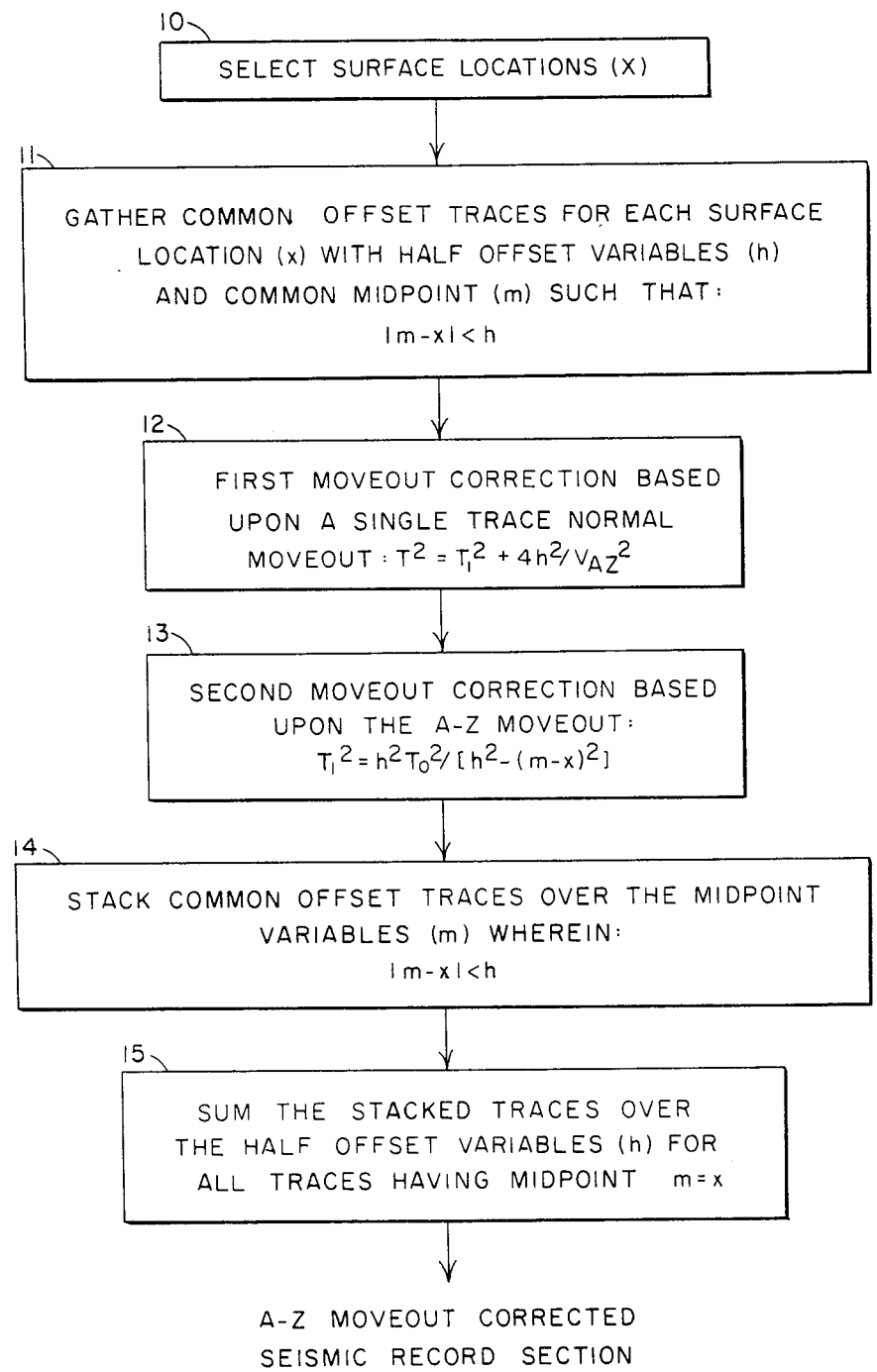
FIGS. 6 & 9 are flow sheets depicting the process of the A-Z moveout correction of the present invention.

The first step in applying the A-Z moveout correction of the present invention to the seismic data, as indicated at 10 in the flow sheet of FIG. 6, is to select the surface location points X at which the seismic traces are to be stacked.

Figure 7:
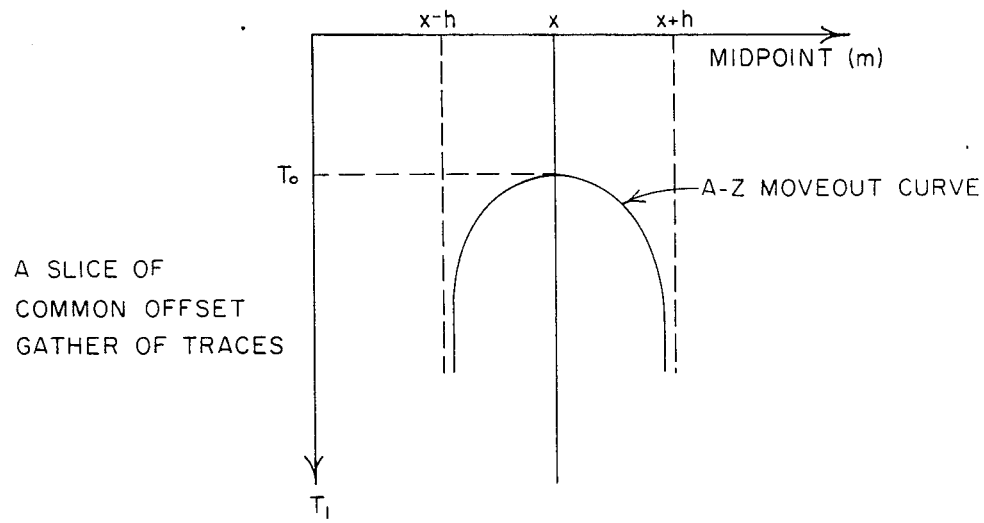

The next step 11 is to gather, for each surface location X, all the traces having the same half offset h. Their midpoints m are within the range $|m-x| < h$. FIG. 7 illustrates such a common offset gather of seismic traces which are now to be moveout corrected.

Figure 1:
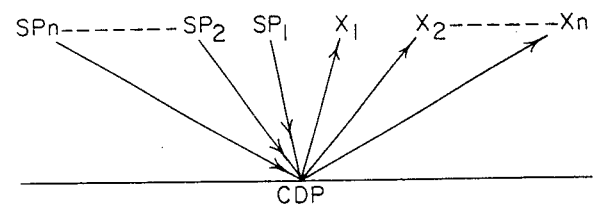
FIG. 1 illustrates a conventional common depth point seismic exploration technique.
Figure 2:
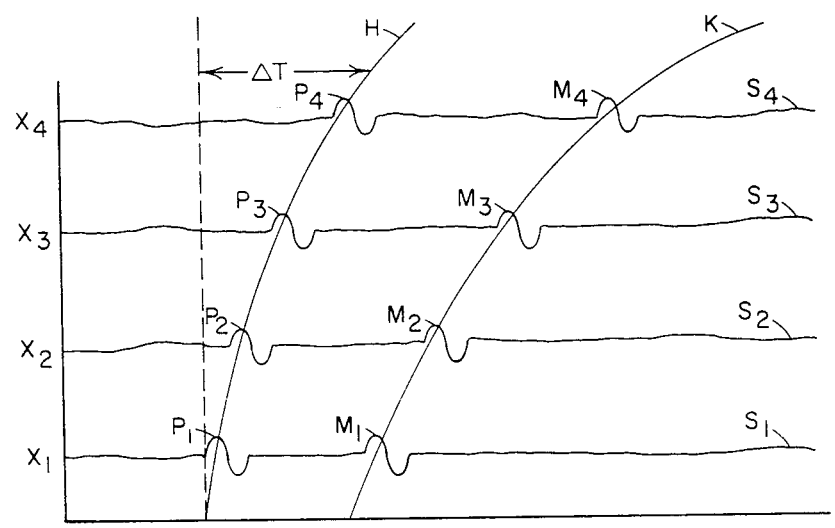
FIG. 2 illustrates a suite of common depth point seismic traces.
Figure 3:
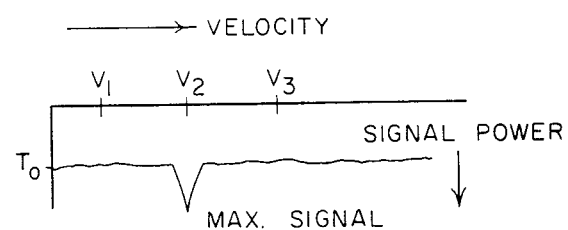
FIG. 3 shows a semblance or signal power as a function of velocity for a particular time $T_o$.

A first moveout correction is applied in the next step 12 to each gather of traces according to the relationship given by equation (5). This is a single trace operation and is the same as the conventional normal moveout correction expressed by equation (1) and illustrated in FIG. 2.

In the next step 13, a second moveout correction is applied to the seismic traces for each half offset h in accordance with the A-Z moveout expression of equation (6).

The final step 14 in the A-Z moveout correction technique of the present invention is to stack the seismic traces over the midpoint variable m wherein $|m-x| < h$.

Figure 8:
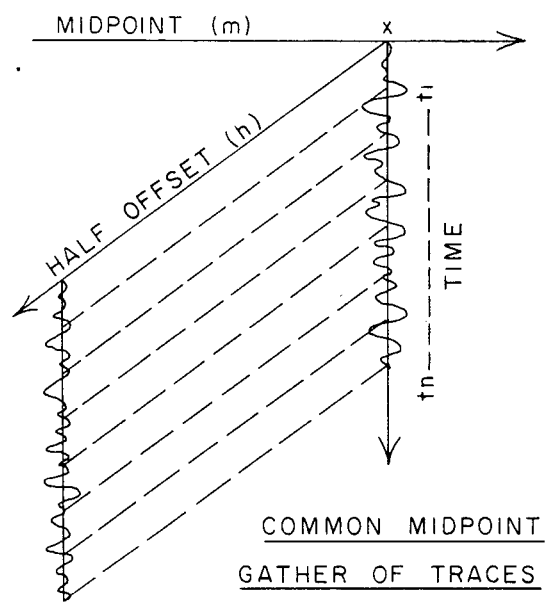
FIGS. 5, 7 & 8 illustrate the various seismic trace gathers employed in the A-Z moveout correction technique of the present invention.

Whereas conventional normal moveout correction is a single trace stretch operation, it can be seen from the foregoing described steps 10–14 that the A-Z moveout correction of the present invention consists of mixing of neighboring traces within each common offset gather as well. This allows a common offset seismic section to be changed into a corresponding zero source-to-receiver seismic section for arbitrary reflector geometry. This use of the A-Z moveout corrected traces is carried out in step 15 wherein the staced A-Z corrected traces from step 14 are summed over the half offset variable h as each of the times $t_l$ through $t_n$, as illustrated in FIG. 8, for all traces having the midpoint $m = x$ to produce the final output or A-Z moveout corrected seismic section. In such A-Z moveout corrected seismic section, dipping and diffraction events are stacked with a dip independent velocity parameter thereby providing an enhanced section in signal-to-noise ratio.

In a still further application of the present invention, the A-Z moveout correction can be used to perform a dip independent velocity determination. Unlike the conventional moveout correction, the A-Z moveout uses the dip independent medium velocity directly and estimate the medium velocity in the presence of crossing events which may be associated with different stacking velocities.

Figure 9:
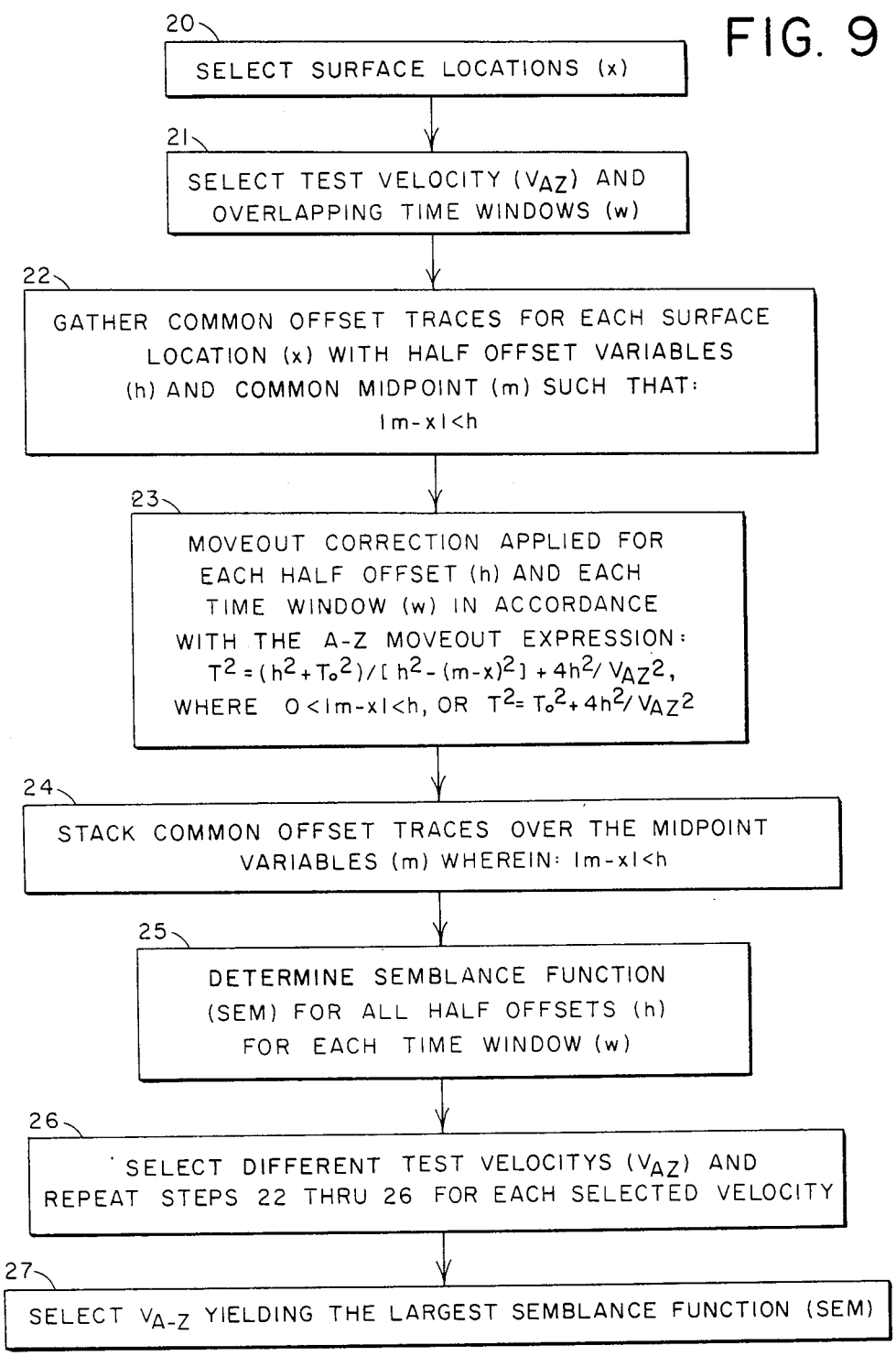

The first step, as indicated at 20 in the flow sheet of FIG. 9, is to select surface locations X.

The next step 21, is to select a sample test velocity $V_{AZ}$ and a set of overlapping time windows W. A typical time window would be about 40 milliseconds.

The next step 22, is to gather for each surface location X, all the traces having the same half offset h. Their midpoints m are within the range $|m-x|<h$.

A moveout correction is then applied in step 23 for each half offset h and each time window w in accordance with the A-Z moveout expression of equation (3).

In step 24, the seismic traces are stacked over the midpoint variable m wherein $|m-x|<h$.

For each time window w, step 25 determines a semblance function SEM for all half offsets h from the stacked traces of step 24. This semblance function SEM is a measure of the similarity or correlation of the A-Z moveout corrected seismic traces among the corresponding time windows pertaining to different half offsets h for the particular test velocity V selected in step 21. Such a semblance function can be expressed:

$$SEM(W,V) = \frac{\Sigma_t[\Sigma_h f w_h V(t)]^2}{N_H \Sigma_t[\Sigma_h f w_h V(t)]^2} \quad (7)$$

It can be seen that the semblance function SEM will range in value from 0 to 1.

At this point, steps 22 thru 25 are repeated for each $V_{AZ}$ of a suite of selected test velocities. This is shown at step 26.

Finally, in step 27, the A-Z velocity is selected as that velocity yielding the largest semblance function SEM. Practically this can be determined from a contour plot of SEM over the time window and velocity variables.

From the foregoing it will be apparent that the process of the present invention can be practiced either with the use of analog computing apparatus such as delay lines, shift registers, drum recorders, contour plotters, etc., or with the use of digital computing apparatus. In one particular embodiment of a digital computing system a Control Data Corporation Model 6600 General Purpose Digital Computer is utilized along with the following input/output components:

Control Computer, 65K Memory
6602 Console Display
6681 Data Channel Converter
405 Card Reader
3447 Card Reader Controller
501 Line Printer
3256 Line Printer Controller The foregoing has described the A-Z moveout correction of the present invention. It is to be understood that various modifications to the disclosed embodiment, as well as alternative embodiments, may become apparent to one skilled in the art without departing from the scope and spirit of the invention as hereinafter defined by the appended claims.

I claim:

1. In seismic exploration wherein seismic reflection signals are obtained from subsurface reflection geometry, the method of correcting said seismic reflection signals to zero source-to-receiver times comprising:
    (a) gathering common offset seismic reflection signals into sets having the same half offset and a common midpoint
    (b) moveout correcting the common offset gathered seismic signals in each of said common midpoint seismic gathers for the time differentials in the occurrence of the primary reflection signals between adjacent receivers along the line of exploration cause by normal moveout from horizontal subsurface reflectors
    (c) moveout correcting the common offset gathered seismic signals in each of said common midpoint seismic gathers to compensate for the time differentials in the occurrence of the primary reflection signals between adjacent receivers along the line of exploration caused by subsurface dipping and diffraction events, whereby arbitrary source-to-receiver seismic reflection signals are moveout corrected to zero source-to-receiver seismic signals.
    (d) stacking the common offset moveout corrected seismic reflection signals over the midpoint variables, and
    (e) summing said stacked common offset moveout corrected seismic reflection signals over the offset variables for each midpoint to produce a common offset seismic record section in which the subsurface dipping and diffraction events are stacked with a dip independent velocity parameter, thereby providing a common offset seismic record section improved in signal-to-noise ratio.

2. The method of claim 1 wherein the step of correcting said seismic signals for time differentials caused by dipping and diffraction events is carried out in accordance with $$T^2 = h^2 T_0^2 / [h^2 - (m-x)^2], 0 < |m-x| < h \quad (9)$$

$$T = T_o \; m = x$$

where
T is the time of reflection on a seismic input signal,
To is the time of reflection on an idealized seismic output signal with zero source-to-receiver offset,
h is one half the horizontal offset distance between the source and receiver
m is the midpoint surface location between source and receiver, and
x is the surface location where the seismic signals will be stacked.

3. In seismic exploration wherein seismic reflection signals are obtained from subsurface reflection geometry, the method of moveout correcting said seismic reflection signals to zero source-to-receiver times and using said moveout correction to perform a dip independent velocity determination, comprising the steps of:
    a. selecting a plurality of surface locations X,
    b. selecting a sample test velocity $V_{AZ}$,
    c. selecting a set of overlapping time windows W,
    d. gathering common offset seismic reflection signals for each of said selected surface locations X having the same half offset h and common midpoint m, e. moveout correcting the common offset gathered seismic signals for each half offset h and each selected time window W in accordance with the expression:

$$T^2 = h^2 T_o^2 / [h-(m-x)^2] + 4h^2/V_{AZ}^2$$

where
- T is the time of reflection on a seismic input signal,
- $T_o$ is the time of reflection on an idealized seismic output signal with zero receiver offset,
- h is one half the horizontal offset distance between the source and receiver,
- m is the midpoint surface location between source and receiver, and
- X is the surface location where the seismic signals will be stacked, f. stacking the common offset moveout corrected seismic signals over the midpoint variables $|m-x|<h$, g. determining a semblance function SEM for all half offsets h for each time window W for the stacked moveout corrected seismic signals in accordance with the expression:

$$SEM(W,V) = \frac{\Sigma_t [\Sigma_h f_{WhV}(t)]^2}{N_H \Sigma_t [\Sigma_h f_{WhV}(t)]^2}$$

where,
- $N_H$ = number of half offsets h
- $f_{WhV}(t)$ = the stacked moveout corrected seismic signals among the corresponding time windows W, pertaining to the different half offsets h for the selected test velocity $V_{AZ}$, and h. repeating steps (c) through (g) for each of a plurality of test velocities $V_{AZ}$, and i. selecting the velocity $V_{AZ}$ that yields the largest semblance function SEM as the dip independent velocity.

* * * * *